United States Patent
Ogihara et al.

(10) Patent No.: US 9,083,043 B2
(45) Date of Patent: Jul. 14, 2015

(54) IRON-DOPED LITHIUM TITANATE AS A CATHODE MATERIAL

(71) Applicants: Hideki Ogihara, Gerlingen (DE); Ingo Kerkamm, Stuttgart-Rohr (DE); Ulrich Eisele, Stuttgart (DE); Jitti Kasemchainan, Gerlingen (DE)

(72) Inventors: Hideki Ogihara, Gerlingen (DE); Ingo Kerkamm, Stuttgart-Rohr (DE); Ulrich Eisele, Stuttgart (DE); Jitti Kasemchainan, Gerlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 201 days.

(21) Appl. No.: 13/729,737

(22) Filed: Dec. 28, 2012

(65) Prior Publication Data

US 2013/0168252 A1    Jul. 4, 2013

(30) Foreign Application Priority Data

Jan. 4, 2012 (DE) .................. 10 2012 200 080

(51) Int. Cl.
  *H01M 4/525* (2010.01)
  *H01M 4/485* (2010.01)
  *C01G 49/00* (2006.01)
  *G01G 23/00* (2006.01)

(52) U.S. Cl.
  CPC ............ *H01M 4/525* (2013.01); *C01G 49/009* (2013.01); *G01G 23/005* (2013.01); *H01M 4/485* (2013.01); *C01P 2002/32* (2013.01); *C01P 2002/54* (2013.01); *Y02E 60/122* (2013.01)

(58) Field of Classification Search
  CPC .............................. H01M 4/525; H01M 4/485
  USPC ........................................................ 429/231.5
  See application file for complete search history.

(56) References Cited

U.S. PATENT DOCUMENTS

2006/0093921 A1* 5/2006 Scott et al. .................... 429/245

FOREIGN PATENT DOCUMENTS

DE   10 2010 001 631   6/2011
JP        2008 060076   3/2008

* cited by examiner

*Primary Examiner* — Helen O Conley
(74) *Attorney, Agent, or Firm* — Kenyon & Kenyon LLP

(57) ABSTRACT

In order to increase the electrochemical stability of a cathode material for lithium cells, the cathode material includes an iron-doped lithium titanate. A method for manufacturing a lithium titanate includes: a) calcinating a mixture of starting materials to form an iron-doped lithium titanate; and b) at least one of electrochemical insertion and chemical insertion of lithium into the iron-doped lithium titanate.

14 Claims, 1 Drawing Sheet

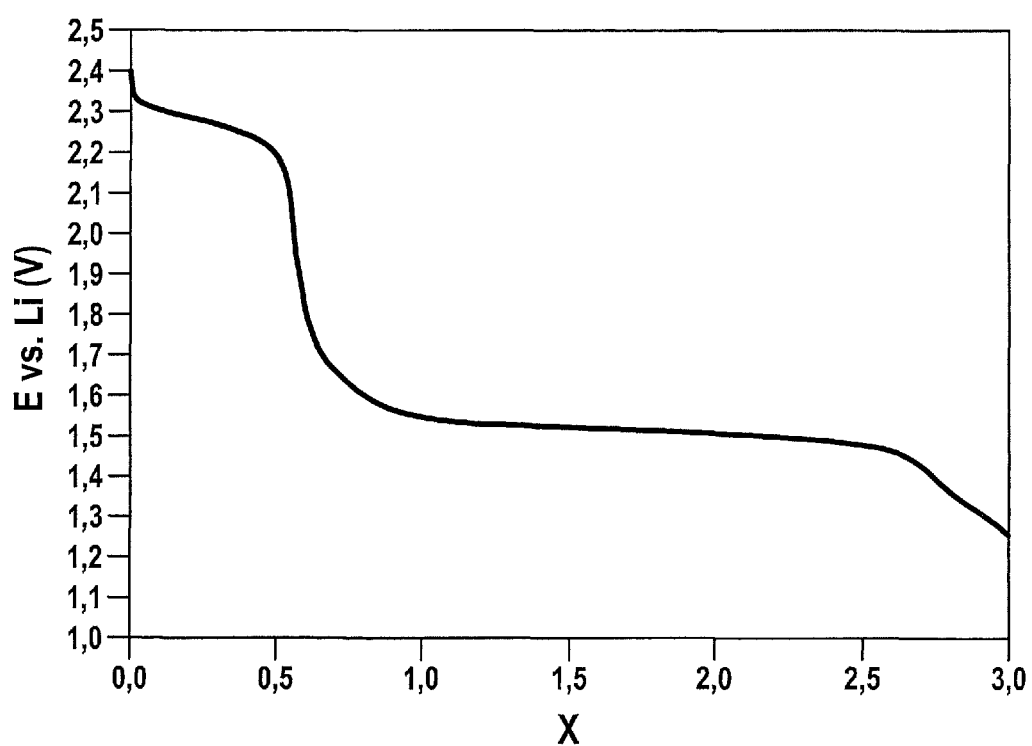

IRON-DOPED LITHIUM TITANATE AS A CATHODE MATERIAL

BACKGROUND OF THE INVENTION

1. Field of the Invention

The present invention relates to a cathode material for lithium cells, a method for manufacturing a lithium titanate, a lithium titanate manufactured in this way, a lithium cell and a mobile or stationary system equipped with the same.

2. Description of the Related Art

Lithium-sulfur batteries may have a high energy density of up to 600 Wh/kg. Lithium-sulfur batteries are based on the overall reaction $2Li+S=Li_2S$, which is capable of supplying a voltage of 2.0 V to 2.5 V. However, lithium-sulfur batteries still have a few adverse effects.

For example, the microstructure of traditional cathodes of a porous carbon-sulfur mixture may change during operation, possibly resulting in breaking of the electrical contacts between the carbon particles and thus resulting in a decline in the charge capacity and the rate capability.

Published German patent application document DE 10 2010 001 631 A1 describes a cathode structure for a lithium cell, which includes a carrier structure. The carrier structure may be formed from a lithium titanium oxide in which some of the lithium may be replaced by magnesium.

Published Japanese patent application document JP 2008-060076 A describes a positive electrode for a secondary battery, which includes $Li_xCo_yM'_{1-y}O_2$, in which M' stands for one or more other metals in addition to cobalt.

BRIEF SUMMARY OF THE INVENTION

An object of the present invention is an iron-doped lithium titanate or a cathode material for a lithium cell, in particular a lithium-sulfur cell or lithium ion cell, which includes an iron-doped lithium titanate.

The iron-doped lithium titanate may be based on a lithium titanate of the general chemical formula $Li_4Ti_5O_{12}$.

The term "based" here may be understood to mean that the lithium titanate may include additional elements in addition to the elements denoted in the formula, in particular as doping, such as iron doping, as in the case described above.

One of the advantages of an iron-doped lithium titanate is based on the fact that (additional) lithium inserted into the lithium titanate may be stabilized by iron doping. Lithium-inserted lithium titanate may be based in particular on the general chemical formula $Li_{4+x}Ti_5O_{12}$, in which $0 \leq x \leq 3$, in particular.

By insertion of (additional) lithium into a lithium titanate, which may also be referred to as a lithium titanium oxide, the lithium ion conductivity of the lithium titanate may be increased advantageously. Furthermore, lithium insertion may also increase the electrical conductivity of the lithium titanate. Lithium-inserted lithium titanate is therefore advantageously suitable as a mixed conductor for lithium cells, for example, lithium-sulfur cells and/or lithium ion cells.

Due to the use of a mixed conductor or a carrier structure and/or a conductive structure of lithium-inserted lithium titanate in a cathode of a lithium-sulfur cell, a stable cathode structure may be provided advantageously, which is not subject to the adverse effects which occur with traditional carbon-sulfur mixed cathodes due to structural changes during operation.

For the use of lithium titanate as the carrier structure and/or as a conductive structure or as a lithium ion-conducting layer in lithium cells, in particular in lithium cell cathodes, the highest possible lithium ion conductivity and the highest possible electrical conductivity (in particular if the lithium titanate functions as an electrical conductor) are desirable. However, pure lithium titanate of the general chemical formula $Li_4Ti_5O_{12}$ has a lithium ion conductivity of only approximately $10^{-7}$ S/cm and an electrical conductivity of $<10^{-9}$ S/cm. Calculations have shown that an electrical conductivity and a lithium ion conductivity of the lithium titanate carrier structure and/or conductive structure of $5 \cdot 10^{-2}$ S/cm would be desirable for achieving a rate capability of 2 C with a lithium-sulfur cell in which the cathode includes a lithium titanate carrier structure and/or a conductive structure.

Through insertion of lithium into $Li_4Ti_5O_{12}$, in particular forming $Li_{4+x}Ti_5O_{12}$, in which $0 \leq x \leq 3$, the lithium ion conductivity and the electrical conductivity may advantageously be increased significantly, thus permitting a rate capability of approximately 2 C.

However, it has been found that if lithium-inserted lithium titanate is used together with sulfur in a cathode of a lithium-sulfur cell, for example, a spontaneous discharge may occur according to the reaction equation:

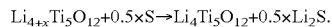

$$Li_{4+x}Ti_5O_{12}+0.5 \times S \rightarrow Li_4Ti_5O_{12}+0.5 \times Li_2S.$$

This is due to the fact that the electrochemical potential of this reaction may be approximately 2.0 V in the case of a solid-body reaction with respect to $Li/Li^+$ and may thus be higher than the electrochemical potential of $Li_{4+x}Ti_5O_{12}$ with respect to $Li/Li^+$, which may be approximately 1.6 V.

However, it has also been found that the electrochemical potential of the lithium titanate may advantageously be increased to more than 2.0 V, in particular to approximately 2.3 V, by iron doping of the lithium titanate. Lithium inserted (additionally) into the lithium titanate by iron doping may advantageously be stabilized by having a higher electrochemical potential of the iron-doped lithium titanate than the electrochemical potential of the above reaction (approximately 2.0 V), and spontaneous discharge in the presence of sulfur may be prevented.

This in turn advantageously permits the use of iron-doped, in particular lithium-inserted, lithium titanate also as a mixed conductor in the presence of sulfur, for example, in a cathode of a lithium-sulfur cell. The capacitance and the battery power may also be increased since iron-doped, in particular lithium-inserted, lithium titanate also has a higher lithium ion conductivity than traditional lithium titanate ($Li_4Ti_5O_{12}$).

Thus, on the whole, doping of lithium titanate with iron may advantageously yield a higher electrochemical stability and an increased rate capability of lithium cells, for example, in particular lithium-sulfur cells. Iron-doped lithium titanate thus advantageously makes it possible to implement stable high-power cathodes.

An iron-doped lithium titanate may be described by the formula $Li_{4-y}Fe_{3y}Ti_{5-2y}O_{12}$ in particular.

In the context of one specific embodiment, lithium titanate is based on the general chemical formula $Li_{4-y}Fe_{3y}Ti_{5-2y}O_{12}$, in which $0<y \leq 1$, in particular 0.2 or 0.25 or $0.345 \leq y \leq 0.75$ or 1, for example, $0.345 \leq y \leq 0.75$. If necessary, the iron-doped lithium titanate may correspond to the general chemical formula $Li_{4-y}Fe_{3y}Ti_{5-2y}O_{12}$, in which $0<y \leq 1$, in particular 0.2 or 0.25 or $0.345 \leq y \leq 0.75$ or 1, for example, $0.345 \leq y \leq 0.75$.

The term "corresponds" may be understood in particular to mean that the lithium titanate does not include any additional elements except for the elements indicated in the formula.

In the context of a further specific embodiment, the iron-doped lithium titanate includes (additional) inserted lithium.

Insertion of additional lithium into a lithium titanate may be described in particular by the formula $Li_{4+x-y}Fe_{3y}Ti_{5-2y}O_{12}$.

In the context of an additional specific embodiment, the lithium titanate is based on the general chemical formula $Li_{4+x-y}Fe_{3y}Ti_{5-2y}O_{12}$, in which $0<y\leq1$, in particular 0.2 or 0.25 or $0.345\leq y\leq 0.75$ or 1, for example, $0.345\leq y\leq 0.75$ and $0\leq x\leq 3$. If necessary, the iron-doped lithium titanate may correspond to the general chemical formula $Li_{4+x-y}Fe_{3y}Ti_{5-2y}O_{12}$, in which $0<y\leq 1$, in particular 0.2 or 0.25 or $0.345\leq y\leq 0.75$ or 1, for example, $0.345\leq y\leq 0.75$ and $0\leq x\leq 3$.

The iron-doped lithium titanate may have a spinel-type structure and/or an NaCl-type structure, in particular a spinel-type structure. A spinel-type structure and/or an NaCl-type structure may be understood to be, for example, a structure resembling and/or including the crystal structure of spinel and/or the crystal structure of table salt. Tests indicate that the structure of lithium titanate may have a spinel-type component and an NaCl-type component, depending in particular on the quantity of inserted lithium.

Doping with niobium and/or tantalum is basically also possible. For example, some of the titanium sites, in particular octahedral sites, may be occupied by niobium atoms and/or tantalum atoms instead of titanium atoms.

Doping with niobium and/or tantalum may be described in particular by the formula $Li_{4-y}Fe_{3y}Ti_{5-2y-m}(Nb,Ta)_{m}O_{12}$ or $Li_{4+x-y}Fe_{3y}Ti_{5-2y-m}(Nb,Ta)_{m}O_{12}$, in which $0\leq m\leq 0.1$, for example.

It is also possible that the iron-doped lithium titanium is additionally doped with copper. Some of the lithium sites may then be occupied by copper atoms instead of lithium atoms in particular. The electrical conductivity may advantageously be further increased by additional copper doping.

Doping with copper may be described in particular by the formula $Li_{4-y-z}Fe_{3y}Cu_{z}Ti_{5-2y-m}(Nb,Ta)_{m}O_{12}$ or $Li_{4+x-y-z}Fe_{3y}Cu_{z}Ti_{5-2y-m}(Nb,Ta)_{m}O_{12}$, in which $z\geq 0$, for example, in particular $0\leq z\leq 0.2$.

In the context of a further specific embodiment, the lithium titanate is based on the general chemical formula $Li_{4+x-y-z}Fe_{3y}Cu_{z}Ti_{5-2y-m}(Nb,Ta)_{m}O_{12}$, in which $0\leq x\leq 3$, $0<y\leq 1$, in particular 0.2 or 0.25 or $0.345\leq y\leq 0.75$ or 1, for example, $0.345\leq y\leq 0.75$, $z\geq 0$, in particular $0\leq z\leq 0.2$ and $0\leq m\leq 0.1$. If necessary, the iron-doped lithium titanate may correspond to the general chemical formula $Li_{4+x-y-z}Fe_{3y}Cu_{z}Ti_{5-2y-m}(Nb,Ta)_{m}O_{12}$, in which $0\leq x\leq 3$, $0<y\leq 1$, in particular 0.2 or 0.25 or $0.345\leq y\leq 0.75$ or 1, for example, $0.345\leq y\leq 0.75$, $z\geq 0$, in particular $0\leq z\leq 0.2$, and $0\leq m\leq 0.1$.

With regard to additional features and advantages of the cathode material according to the present invention, reference is herewith made explicitly to the explanations in conjunction with the methods according to the present invention, the lithium titanate according to the present invention, the lithium cell according to the present invention, the mobile or stationary system according to the present invention and to the examples.

A further object of the present invention is a method for manufacturing a lithium titanate, which includes the following method steps:

In the context of a method step a), a mixture of starting materials is calcined to form an iron-doped lithium titanate.

In the context of a method step b), an electrochemical and/or a chemical insertion of (additional) lithium into the calcined and, if necessary, sintered product then takes place.

Chemical insertion of lithium may take place in particular by immersing the calcined and, if necessary, sintered product into a lithium-containing liquid. For example, a butyllithium solution, e.g., butyllithium in n-hexane, may be used for this purpose.

The calcined and, if necessary, sintered product may remain in the lithium-containing liquid for a long period of time, for example, a few days or one or more weeks. During this dwell time, lithium ions may penetrate out of the lithium-containing liquid into the calcined and, if necessary, sintered product and may be inserted or intercalated into its chemical structure. It is possible in this way to cause the iron-doped lithium titanate, for example, $Li_{4+x-y}Fe_{3y}Ti_{5-2y}O_{12}$, to have a higher lithium content than traditional lithium titanate ($Li_4Ti_5O_{12}$) and iron-doped and non-lithium-inserted lithium titanate ($Li_{4+x-y}Fe_{3y}Ti_{5-2y}O_{12}$).

Electrochemical insertion of lithium may be performed in particular by installing the calcined and, if necessary, sintered product as a cathode in a galvanic charging cell.

The charging cell may include in particular a lithium-containing anode, for example, a lithium metal anode and a lithium-containing electrolyte. In addition to the calcined and, if necessary, sintered product, the cathode of the charging cell in particular does not include any other electrochemically active cathode materials such as $Li(Ni, Mn, Co)O_2$ and/or sulfur.

The charging cell thus differs from traditional lithium cells, which additionally include an electrochemically active cathode material such as $Li(Ni, Mn, Co)O_2$ and/or sulfur, designed specifically to incorporate or to bind lithium particularly easily and rapidly during operation of the lithium cell. However, this incorporation or binding mechanism is in competition with an insertion of lithium into a lithium titanate in lithium cells, which is why the insertion of lithium into a lithium titanate, which is also present, if necessary, does not occur with lithium cells containing active material.

Due to the fact that the cathode of the charging cell does not include any electrochemically active cathode materials, (additional) lithium may be inserted into the lithium titanate in a targeted manner by the charging cell.

After the chemical or electrochemical insertion of lithium, the lithium-inserted product may be removed from the lithium-containing liquid or the charging cell.

The cathode of the charging cell may include at least one additive to increase the electrical conductivity, in particular conductive carbon black and/or at least one binder in addition to the iron-doped lithium titanate. The electrical conductivity of the cathode material may be increased by the additive for increasing the electrical conductivity and thus the charging reaction may be improved. The binder makes it possible to achieve a mechanical cohesion of the cathode material and thus a simpler processing. Removal of the conductive additive or the binder may advantageously be omitted because the same additive is used for the cathode of the charging cell to increase the electrical conductivity or the same binder is used as in a cathode material, which is to be furnished subsequently with the manufactured lithium titanate, or in a lithium cell.

The calcination may be performed at a temperature in a range of $\geq 700°$ C. to $\leq 900°$ C., for example, at approximately 800° C. The calcination may be performed over a period of time within a range from $\geq 6$ h to $\leq 1.4$ h, for example, for approximately 10 hours.

The mixture of starting materials may be ground by using a ball mill, for example, a planetary ball mill, in particular, before calcination.

In the context of a further specific embodiment, the mixture of starting materials includes at least one lithium-containing starting compound, for example, lithium carbonate, lithium oxide and/or lithium hydroxide, at least one titanium-containing starting compound, for example, titanium dioxide, and at least one iron-containing starting compound, for example, iron oxide, e.g., iron(III) oxide. The at least one lithium-containing starting compound is preferably used in excess, e.g., an excess of 3 wt %, based on the stoichiometric amount of the at least one lithium-containing starting compound.

In the context of a further specific embodiment, the mixture of starting materials additionally includes at least one copper-containing starting compound, for example, copper oxide, in particular copper(II) oxide and/or copper(I) oxide.

The sintering may be performed, for example, at a temperature in a range of $\geq 850°$ C. to $\leq 950°$ C., e.g., at approximately $950°$ C.

With regard to additional features and advantages of the method according to the present invention, reference is herewith made explicitly to the explanations in conjunction with the cathode material according to the present invention, the lithium titanate according to the present invention, the lithium cell according to the present invention, the mobile or stationary system according to the present invention and to the examples.

Another object of the present invention is a lithium titanate manufactured by a method according to the present invention.

With regard to additional features and advantages of the lithium titanate manufactured according to the present invention, reference is herewith made explicitly to the explanations in conjunction with the cathode material according to the present invention, the method according to the present invention, the lithium cell according to the present invention, the mobile or stationary system according to the present invention and to the examples.

A further object of the present invention is a lithium cell, in particular a lithium-sulfur cell or a lithium ion cell, which includes a cathode material according to the present invention and/or a lithium titanate manufactured according to the present invention.

The cathode of the lithium cell may include in particular lithium titanate.

In the context of one specific embodiment, the cathode of the lithium cell has a conductive structure, which includes or is formed from lithium titanate.

With regard to additional features and advantages of the lithium cell according to the present invention, reference is herewith made explicitly to the explanations in conjunction with the cathode material according to the present invention, the method according to the present invention, the lithium titanate manufactured according to the present invention, the mobile or stationary system according to the present invention and to the examples.

Another object of the present invention is a mobile or stationary system which includes a lithium cell according to the present invention, in particular a lithium-sulfur cell or a lithium ion cell. It may be in particular a vehicle, for example, a hybrid vehicle, a plug-in hybrid vehicle or an electric vehicle, an energy storage system, for example, for stationary energy storage, for example, in a house or an industrial plant, an electric tool, an electric garden tool or an electronic device, for example, a notebook, a PDA or a cell phone.

With regard to further features and advantages of the mobile or stationary system according to the present invention, reference is herewith made explicitly to the explanations in conjunction with the lithium titanates according to the present invention, the method according to the present invention, the cathode material according to the present invention, the lithium cell according to the present invention and to the examples.

Additional advantages and advantageous embodiments of the objects according to the present invention are illustrated in the drawing and the examples are explained in the following description. It should be pointed out that the drawing and the examples have only a descriptive character and are not intended for restricting the present invention in any way.

BRIEF DESCRIPTION OF THE DRAWING

FIG. 1 shows a potential curve measured on a sample during the first discharge cycle at a C rate of approximately C/100.

DETAILED DESCRIPTION OF THE INVENTION

1. Manufacturing $Li_{4-y}Fe_{3y}Ti_{5-2y}O_{12}$ $Li_{4-y}Fe_{3y}Ti_{5-2y}O_{12}$, in which y=0.345–0.75, was manufactured by a traditional ceramic solid-body reaction using lithium carbonate ($Li_2CO_3$, purity 99.0%, from Alfa Aesar), titanium dioxide ($TiO_2$, rutile, from Tronox) and iron oxide ($Fe_2O_3$ from Merck) as starting materials. The starting materials were weighed using a excess of $Li_2CO_3$ to compensate for the loss of lithium during calcination. The starting materials were subsequently ground using a planetary ball mill.

The resulting powdered mixture was calcined for 10 hours under an air atmosphere at $800°$ C. Samples produced in this way contained the desired single-phase product.

2. Electrochemical Insertion of Lithium into $Li_{4-y}Fe_{3y}Ti_{5-2y}O_{12}$/Manufacturing $Li_{4+x-y}Fe_{3y}Ti_{5-2y}O_{12}$ For electrochemical insertion of lithium into $Li_{4-y}Fe_{3y}Ti_{5-2y}O_{12}$ and thus for manufacturing $Li_{4-y+x}Fe_{3y}Ti_{5-2y}O_{12}$, in which $0<x\leq 3$, a test cell was assembled containing a lithium metal anode, a composition including $Li_{4-y}Fe_{3y}Ti_{5-2y}O_{12}$ as the cathode, 350 µL of a 1.0M solution of $LiPF_6$ in ethylene carbonate (EC)/dimethyl carbonate (DMC) (1:1 mixture, based on volume) as liquid electrolytes and a glass microfiber separator distributed under the brand name Whatman. The cathode composition included 84 wt. % $Li_{4-y+x}Fe_{3y}Ti_{5-2y}O_{12}$ powder, 8 wt % carbon black and 8 wt. % polyvinylidene fluoride (PVdF) and was applied by film casting to a current collector made of aluminum.

In another example, Swagelok test cells were constructed for electrochemical insertion of lithium into $Li_{4-y}Fe_{3y}Ti_{5-2y}O_{12}$ and thus for manufacturing $Li_{4-y+x}Fe_{3y}Ti_{5-2y}O_{12}$, in which $0<x\leq 3$; these test cells contained a lithium metal anode, a pressed $Li_{4-y}Fe_{3y}Ti_{5-2y}O_{12}$ pellet as the cathode, 200 µL of a 1.0M solution of LiTFSI in 1,3-dioxolane (DOL)/ethylene glycol dimethyl ether (DME) (1:1 mixture based on volume) as liquid electrolytes and containing a separator distributed under the brand name Celgard.

A voltage of 1.5 V was obtained in the test cells on electrochemical insertion of lithium.

3. Analysis

The crystalline phase and the chemical composition of the samples were analyzed by x-ray diffraction, in particular µXRD, scanning electron microscopy/energy dispersive x-ray spectroscopy (SEM/EDX), transmission electron microscopy (TEM)/electron energy loss spectroscopy (EELS)/diffraction and/or atomic emission spectrometry, in particular with an inductively coupled plasma ((ICP)-AES; English: inductive coupled plasma atomic emission spectroscopy).

The analyses have shown that the amount of lithium ions in octahedral positions is increased by insertion or intercalation of lithium into $Li_4Ti_5O_{12}$, which induces an increase in lithium conductivity.

3.1 Potential Curve During the First Discharge Cycle at a C Rate of Approximately C/100 (FIG. 1)

FIG. 1 shows the potential curve of the sample of the general chemical formula $Li_{3.75+x}Fe_{0.75}Ti_{4.50}O_{12}$ during the first discharge operation at a constant C rate of approximately C/100. The potential was measured over the length of the discharge current.

FIG. 1 illustrates that $Li_{3.75+x}Fe_{0.75}Ti_{4.50}O_{12}$ has a two-step discharge behavior. Compositions containing an amount of inserted lithium x, which is less than or equal to a certain limiting value $x_c$, have a potential of approximately 2.3 V in comparison with $Li/Li^+$. Compositions containing an amount of inserted lithium x greater than limiting value $x_c$ have a potential of approximately 1.5 V in comparison with $Li/Li^+$.

Since the potential for formation of $Li_2S$ is only 2.0 V and is thus lower than 2.3 V, no spontaneous discharge occurs due to the formation of $Li_2S$ with compositions containing an amount of inserted lithium x which is less than or equal to limiting value $x_c$. The iron-doped lithium titanate may therefore be stabilized at $x=x_c$. In particular the maximum lithium ion conductivity may also be $x=x_c$.

However, lithium ($x>x_c$) inserted additionally would react with sulfur to form $Li_2S$.

Further research has shown that by increasing the iron doping to a range of up to $y \leq 1$, limiting value $x_c$ may be increased to the extent that in the complete lithium-inserted range $0 \leq x \leq 3$ the potential is greater than the potential required to form $Li_2S$ and therefore a spontaneous discharge may be prevented.

What is claimed is:

1. A cathode material for a lithium cell, comprising:
   an iron-doped lithium titanate;
   wherein the lithium titanate is based on the general chemical formula:

$Li_{4-y}Fe_{3y}Ti_{5-2y}O_{12}$, and wherein $0.2 \leq y \leq 1$.

2. The cathode material as recited in claim 1, wherein the lithium titanate includes inserted lithium.

3. A cathode material for a lithium cell, comprising:
   an iron-doped lithium titanate;
   wherein the lithium titanate is based the general chemical formula:

$Li_{4+x-y}Fe_{3y}Ti_{5-2y}O_{12}$, and wherein $0.2 \leq y \leq 1$ and $0 \leq x \leq 3$.

4. A cathode material for a lithium cell, comprising:
   an iron-doped lithium titanate;
   wherein the lithium titanate is based on the general chemical formula:

$Li_{4+x-y-z}Fe_{3y}Cu_zTi_{5-2y-m}(Nb,Ta)_mO_{12}$, and wherein
   $0 \leq x \leq 3$,
   $0.2 \leq y \leq 1$,
   $0 \leq z \leq 0.2$ and
   $0 \leq m \leq 0.1$.

5. A lithium cell, comprising:
   a cathode material including an iron-doped lithium titanate, wherein the lithium titanate is based on the general chemical formula:

$Li_{4+x-y-z}Fe_{3y}Cu_zTi_{5-2y-m}(Nb,Ta)_mO_{12}$ wherein
   $0 \leq x \leq 3$,
   $0.2 \leq y \leq 1$,
   $0 \leq z \leq 0.2$ and
   $0 \leq m \leq 0.1$.

6. The lithium cell as recited in claim 5, wherein the cathode has a conductive structure, the conductive structure including the lithium titanate.

7. The lithium cell as recited in claim 5, wherein the lithium cell is part of one of a vehicle, an energy storage system, an electric tool, or an electronic device.

8. The lithium cell as recited in claim 6, wherein the lithium cell is part of one of a vehicle, an energy storage system, an electric tool, or an electronic device.

9. A lithium cell, comprising:
   a cathode material having an iron-doped lithium titanate;
   wherein the lithium titanate is based on the general chemical formula:

$Li_{4-y}Fe_{3y}Ti_{5-2y}O_{12}$, and wherein $0.2 \leq y \leq 1$.

10. The lithium cell of claim 9, wherein the lithium cell includes a lithium-sulfur cell or a lithium ion cell.

11. A lithium titanate, comprising:
    an iron-doped lithium titanate formed from a calcinated mixture of starting materials and having electrochemically or chemically inserted lithium, wherein the lithium titanate is based on the general chemical formula: $Li_{4-y}Fe_{3y}Ti_{5-2y}O_{12}$, and wherein $0.2 \leq y \leq 1$.

12. The lithium titanate of claim 11, wherein an electrochemical lithium insertion occurred from the iron-doped lithium titanate being installed as the sole material for a cathode in a galvanic charging cell which includes a lithium-based anode and a lithium-based electrolyte.

13. The lithium titanate of claim 11, wherein the mixture of starting materials includes at least one lithium-containing starting compound, at least one titanium-containing starting compound and at least one iron-containing starting compound.

14. The lithium titanate of claim 13, wherein the mixture of the starting material further includes at least one copper-containing starting compound.

* * * * *